United States Patent [19]

Hopland

[11] Patent Number: 5,271,701
[45] Date of Patent: Dec. 21, 1993

[54] CARGO TRANSFER SYSTEM AND CARGO TRANSFER MEANS FOR LOADING AND ONLOADING OF SHIPS

[75] Inventor: Moritz Hopland, Austrheim, Norway

[73] Assignee: Seatrans Ans, Hop, Norway

[21] Appl. No.: 730,911

[22] PCT Filed: Jan. 12, 1990

[86] PCT No.: PCT/NO90/00007
§ 371 Date: Jul. 29, 1991
§ 102(e) Date: Jul. 29, 1991

[87] PCT Pub. No.: WO90/08690
PCT Pub. Date: Aug. 9, 1990

[30] Foreign Application Priority Data

Jan. 30, 1989 [NO] Norway .................................. 890368

[51] Int. Cl.⁵ .............................................. B63B 27/16
[52] U.S. Cl. ........................... 414/139.7; 414/140.8; 414/141.7
[58] Field of Search ............... 414/139.4, 139.6, 139.7, 414/140.8, 141.7, 142.8, 564

[56] References Cited

U.S. PATENT DOCUMENTS

| | | | |
|---|---|---|---|
| 2,797,824 | 7/1957 | Anschutz | 414/139.6 X |
| 2,876,919 | 3/1959 | True et al. | 414/139.7 X |
| 3,508,668 | 4/1970 | Young | 414/140.8 |
| 3,995,751 | 12/1976 | Omote | 414/140.8 |
| 4,043,285 | 8/1977 | Nordstrom | 414/142.8 X |
| 4,046,266 | 9/1977 | Ide | 414/140.8 |
| 4,175,908 | 11/1979 | Anderson | 414/786 |
| 4,878,796 | 11/1989 | Ammeraal | 414/141.7 |
| 5,039,275 | 8/1991 | Ide | 414/141.7 X |

FOREIGN PATENT DOCUMENTS 28087  3/1981  Japan .................. 414/140.8

*Primary Examiner*—David A. Bucci
*Attorney, Agent, or Firm*—Francis C. Hand

[57] ABSTRACT

A system for transferring cargo from a ship to a quay and vice versa comprises a reloading platform with an associated conveyor arranged in a side port opening of a ship and a conveyor arranged on a quay. The system includes a transfer platform with separate conveyors for transporting the cargo horizontally as well as support members fastened to the ship and quay, respectively, a pair of guides which are arranged between the support members and hoisting wires for lifting and lowering the transfer platform along the guides. In another embodiment, the transfer system can be mounted on a stand which remains on a quay. In this embodiment, the upper support member is releasably connected to the reloading platform of a ship which is brought alongside the quay.

17 Claims, 4 Drawing Sheets

CARGO TRANSFER SYSTEM AND CARGO TRANSFER MEANS FOR LOADING AND ONLOADING OF SHIPS

Hitherto it has been usual to employ a fork lift truck on the quay for a transportation of cargo to and from a side port opening of a ship and for the transfer of cargo from the quay to a reloading platform on board the ship. With such a loading system, the fork lift trucks during driving must effect considerable swing movements at the same time as it is driven to and from on the quay, with and without cargo, in addition to the lifting and lowering of the loading forks in connection with the handling of the cargo. In order to achieve high loading and unloading capacity, the use of a large number of fork lift trucks is required. As a consequence of the high speed of driving and beyond that the large activity and limited view, complications can easily occur with interruption in the operation of the loading trucks on the quay and corresponding interruption in the handling of cargo on board the ship.

Alternatively, a stationarily arranged conveyor can be employed on the quay for the transportation of cargo to or from the ship and a fork lift truck for the transfer of cargo to and from the delivery location of the reloading platform from and to the conveyor on the quay. An advantage of such a system is that effective transportation of cargo on the conveyor on the quay can be achieved, for example between a warehouse and an unloading position on the quay, mainly with straight line movements, without particular transportation complications. In addition, a buffer zone can be readily achieved at the discharge position, so that there is constantly present there cargo availability for further transporation, independent of the loading and unloading operations. By use of fork lift trucks in connection with such a stationarily arranged conveyor there is obtained in itself a simple cargo transfer between quay and ship. By reason of the necessary driving pattern of the fork lift truck with relatively small drive lengths, but with associated frequent and partly sudden turning movements, and subsequent lifting and lowering movements, the fork lift truck or the fork lift trucks will constitute a vital, but readily vulnerable factor in the system, with the possibility for considerable complications in the transfer of cargo.

It is an object of the invention to provide an arrangement where a simpler cargo transfer can be attained with simpler operation.

It is another object of the invention to provide for a remote control of the transfer of cargo from a location at which cargo elevators and the like are operated.

It is another object of the invention to eliminate the need for the use of fork lift trucks on a quay for loading and unloading of cargo to and from a ship.

It is another object of the invention to provide a simple and effective transfer of cargo between a delivery location on a reloading platform and a conveyor on a quay.

It is another object of the invention to attain a more or less automatic handling of cargo for loading and unloading of ships.

It is another object of the invention to obtain as far as possible a rectilinear movement pattern for cargo in order to be able to obtain a reliable and damage free transfer system.

It is another object of the invention to reduce the number of handlings for the automatic handling of cargo during loading and unloading of a ship.

Briefly, the invention provides a transfer system for transferring cargo between a ship and a quay.

In one embodiment, the ship is provided with a side port opening, a reloading platform extending through the opening and a cargo elevator which communicates with the platform for conveying cargo therebetween. In addition, the quay is provided with a conveyor for transporting cargo.

The transfer system includes a transfer platform having at least one conveyor, and preferably two conveyors for transporting cargo horizontally, a first support member for securement to a ship, a second support member for mounting on the quay, guide means pivotally connected to and between the support members and connected to the transfer platform for guiding the transfer platform between the support members and means for lifting and lowering the platform along the guide means.

In another embodiment, the transfer system has a stand in which the support members, guide means and means for lifting and lowering the transfer platform are mounted to form a unit. In this embodiment, this unit can be mounted on a quay for use with different ships. In this case, the first support member would be releasably secured to the reloading platform of a ship.

The transfer system is such that one has the possibility of transporting cargo in the one direction from the conveyor on the quay and in the second direction from the conveyor on the quay via the conveyor of the transfer platform to the conveyor of the reloading platform, by a parallel displacement of the cargo, that is to say without having to expose the cargo to unnecessary turning movements. In order to ensure the transfer between ship and quay with a lifting and lowering means, such as an elevator arrangement which comprises hoisting wires, while the transfer platform is controlled along the guide means between the support means on the ship and on the quay, the transfer can consequently take place in a relatively controlled manner in rectilinear paths of movement.

The present invention also relates to a transfer means in the loading and unloading arrangement for the transfer of cargo from ship to quay, and vice versa.

The cargo transfer means is characterised in that the transfer means comprises a first support member or a pair of first support members which are adapted to be fastened to the ship and a second support member which is adapted to be supported via wheels, slide means or the like together with rails on the quay, and a pair of guide means which are arranged between said first and second support members together with a transfer platform which is controllable along the guide means, the transfer platform being adapted to be lifted and lowered by means of hoisting wires via support castors of the first support member or the first pair of support members.

According to the invention one can either employ a transfer system which is brought along with the ship from harbour to harbour or one can employ a transfer system which is used stationarily in the individual harbour for different ships.

It is preferred according to the invention that the guide means are axially moveable at the one end either relative to the first or relative to the second support member, and that each guide means is pivotably mounted about a first upper, horizontal axis and parallel to the rails on the quay, while the second support member is moveable in the fore-and-aft direction via support wheels or slide means along rails on the quay.

Consequently, it will be possible to compensate for turning movements of the ship about its longitudinal axis and compensate for the deep draught of the ship relative to the quay and compensate for the vertical movements of the ship on ebb and flow, by allowing a certain, limited pivoting of the guide means relative to the first and the second support member together with an axial movement of the respective one end of the guide means relative to the first or the second support member, Similarly, it will be possible to compensate for possible longitudinal movements of the ship relative to the quay by allowing the second support member to be moved along the rails on the quay.

By this, loading and unloading can be effected without complications in step with movements of the ship relative to the quay with a more or less stationarily arranged arrangement (stationarily arranged on ship or on quay).

In a first case, where the transfer platform is carried via the first support member on the reloading platform, the system is characterised in that the guide means are axially displaceable in respective sleeve-shaped control means which are pivotably mounted about the first axis on the first support member.

In a second case, where the transfer platform is carried via the first support member in a carrying stand on the second support member, the system is characterised in that the guide means are axially displaceable in their respective sleeve-shaped control means which are pivotably mounted about the second axis on the second support member.

In both cases, the transfer platform can be moved unhindered along the guide means, actuated by the weight loading from the transfer platform, with or without cargo, that is to say with a movement which can compensate for wave movements of the sea and for other movements occurring in a plane transversely of the ship. In this connection, there can be built in in addition, in a manner known per se, a lift-compensating arrangement in the elevator arrangement itself so as to ensure a set pattern of movement for the transfer platform relative to the quay during transfer of the transfer platform to and from the quay.

In order to avoid unnecessary listing of the ship, during transfer of cargo to and from the transfer platform from and to the quay or from and to the ship, it is desirable to be able to stabilize the ship in a set position during the loading and unloading operation itself. Similarly, it is desirable during the loading and unloading operation to be able to stabilize the ship against occurring listing movements produced by movements of the sea against the ship relative to the quay. According to the invention one has been able to combine such desired stabilizing with a desired control of the transfer movement of the cargo between quay and ship, or vice versa. One has achieved this in that by means of a one-way operating pneumatic or hydraulic pressure cylinder with pressure build up in the one direction of movement and pressure discharge in the opposite direction of movement, by means of the weight loading from the transfer platform and cargo or by means of the weight loading from the ship, the guide means are adapted to exert a hydraulic elastic force of a specific size in the one power transfer direction between transfer platform and lower support member or between upper and lower support member.

By this one has been able to produce a support force on a certain size between ship and quay via the guide means, dependent upon the weight of the cargo on the transfer platform or the loading produced by the listing movement of the ship, so that the weight loading instead of producing listing of the ship and corresponding movement of the transfer platform, is discharged directly to the quay. By this one will also be able to tension the lower support member, via associated support wheels or slide means, with great frictional force against associated rails on the ground of the quay so as to produce thereby an intermittently occurring, effective support against the quay with the support member in a set, movement-obstructed position on the rails. Immediately the elastic force is relieved, one has the greater possibility of allowing the support member to displace itself to a suitable new position dependent upon and as compensation for possible longitudinal movements of the ship relative to the quay.

According to the invention an easy automatic adjustment of the transfer mechanism between quay and ship is consequently obtained after movements of the ship occur relative to the quay. With the aid of simple means a corresponding adjustment of the equipment at the discharge location can also be effected relative to the associated conveyor on the quay, by undertaking a controlled movement of the equipment parallel to the support rails for the lower support member of the transfer mechanism.

Further features of the present invention will be evident from the following description having regard to the accompanying drawings, in which.

Figure 1:
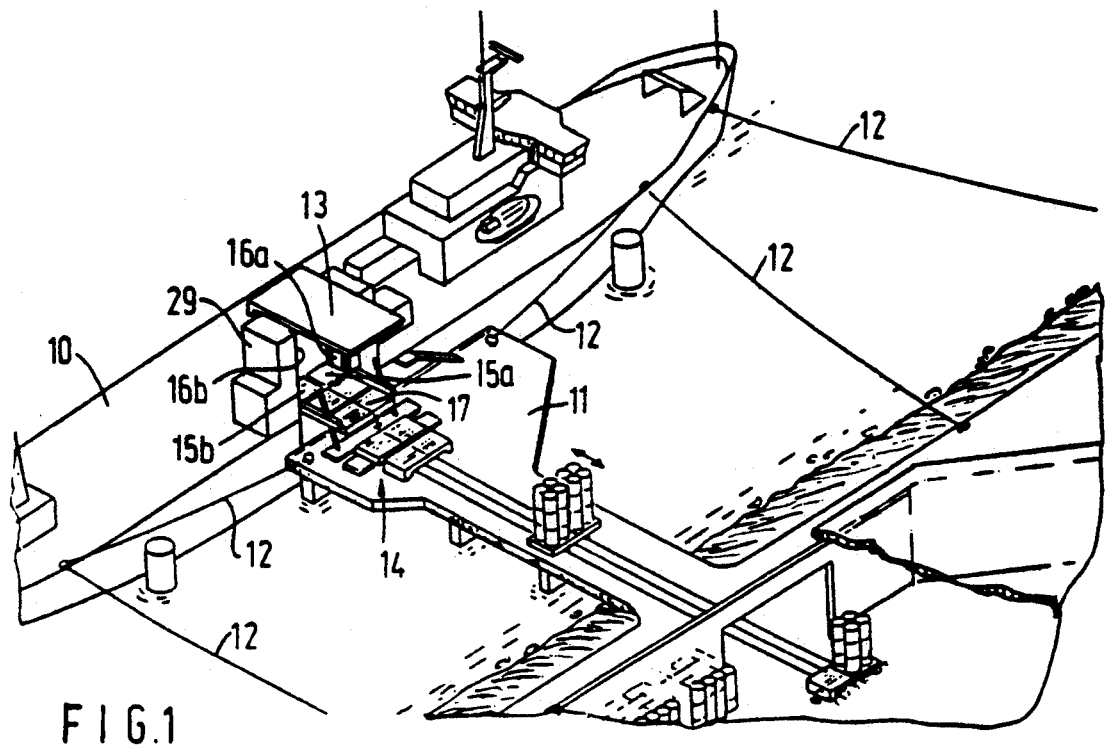
FIG. 1 shows in perspective a schematic sketch of the system according to the invention.

FIG. 1 shows in perspective a ship 10 secured relative to a quay with mooring lines 12. The ship is shown with a side port 13 in an open position in connection with a loading and unloading system 14 between ship 10 and quay 11.

On board the ship there are shown two parallel elevators 15a and 15b controlled by their respective elevator guides 16a,16b for the transportation of cargo vertical internally in the ship in an associated common elevator shaft 16.

Figure 2:
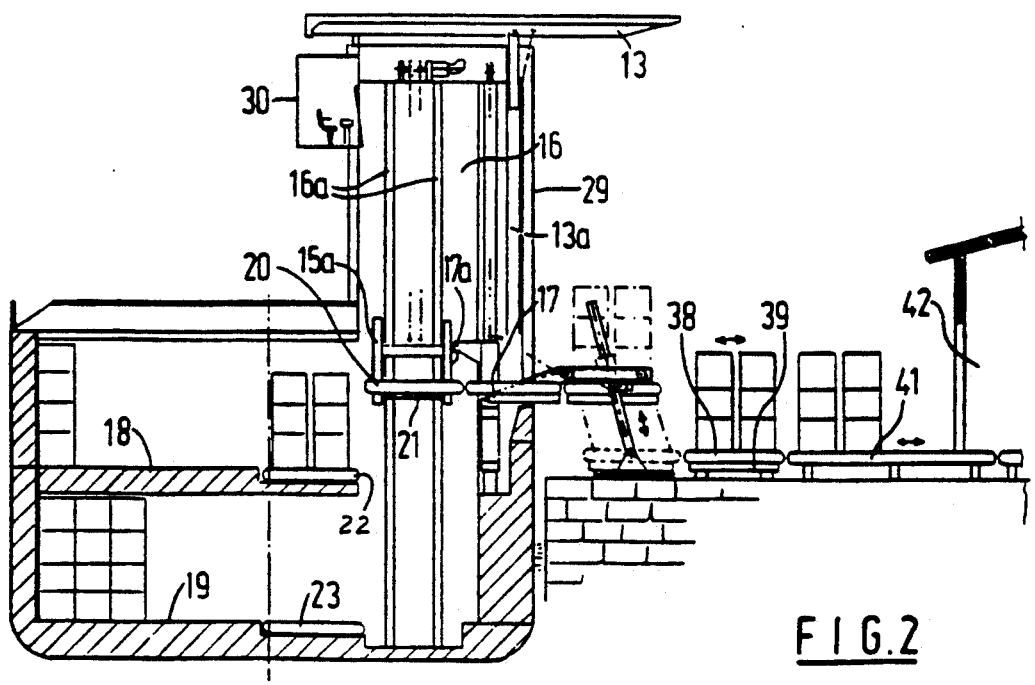
FIG. 2 shows a section of the system according to FIG. 1 illustrated in vertical section.

In FIG. 2 there is shown the zone of movement of the elevator between a reloading platform 17 in an opening 13a of the side port 13 and an upper loading deck 18 and a lower loading deck 19 respectively. There is shown a first conveyor 20 on a platform 21 of the elevator 15a. Furthermore, there is shown in each of the decks 18 and 19 a corresponding second conveyor 22 and a third conveyor 23 respectively, which cooperate with the conveyor 20 for transferring cargo from and to the decks 18,19 to and from the elevator 15a (15b).

The reloading platform 17 can be lifted and lowered in the port opening 13a according to need via associated elevator machinery. At 17a there is shown a stop which is fastened to the reloading platform 17 and which projects outward into the vertical path of movement of the elevator 15a so as to ensure that the conveyor 20 of the elevator shall be precisely flush in the transfer position with a fourth pair of conveyors 24 (see FIG. 4) on the reloading platform 17. In practice there is used a continuous reloading platform 17 with two separate conveyors 24, that is to say a conveyor for each of the elevators 15a,15b, so that these can be operated parallel and independently of each other.

Figure 3:
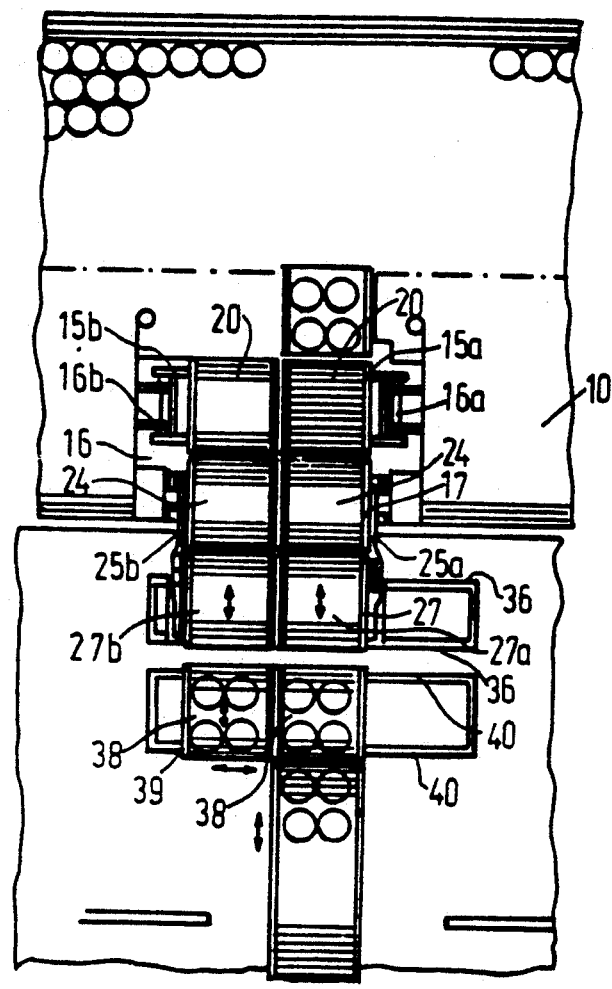
FIG. 3 shows a section of the system according to FIG. 1 illustrated in horizontal section.

From the reloading platform 17, there projects outside the side of the ship, a pair of carrying arms 25a, 25b, as shown in FIG. 3, which via their respective pairs of hoisting wires 26a, 26b carry a continuous transfer platform 27 (see FIG. 4) at its opposite ends. The transfer platform 27 is provided with two separate conveyors 27a,27b, which can be operated separately. The wires 26a,26b pass over guide pulleys 28a, 28b in the arms 25a,25b and are operated via a machinery 43 in the reloading platform 17 (see FIG. 4) for winding and unwinding. At 30 (FIG. 2) there is shown an operation location for an operator who attends to the reloading platform 17 and the elevators 15a,15b toghether with associated conveyors.

The carrying arms 25a,25b form an upper support member for a transfer means which includes the transfer platform 27. In each of the carrying arms 25a,25b (in FIG. 4 there is shown only the one arm 25b) a stationarily arranged guide sleeve 31 is fastened pivotably mounted about a first horizontal, upper pivotal axis 31a for axially displaceable reception of an associated rod-shaped guide means 32. The platform 27 is displaceable along the respective guide means 32 by means of a sliding sleeve 33. The sliding sleeve 33 is pivotably mounted relative to the platform 27 via a second horizontal, middle pivotal axis 33a (see FIG. 5). The lower end of the guide means 32 is pivotably mounted via a third horizontal, lower pivotal axis 32a in a bracket 34a on a carriage 34 which forms the lower support member of the transfer means. The carriage 34 is moveable on the quay 11 in the fore-and-aft direction of the ship parallel to the pivotal axes 31a and 32a by means of wheels 35 which roll on the rails 36. Alternatively, the carriage can slide on the rails 36 by means of slide means (see FIG. 5). The fifth pair of conveyors 27a, 27b of the platform 27 are adapted to be flush with the fourth pair of conveyors 24 on the platform 17 in the upper position of the platform 27 and flush with a sixth pair of conveyors 38 on a standby platform 39 on the quay 11.

Figure 4:
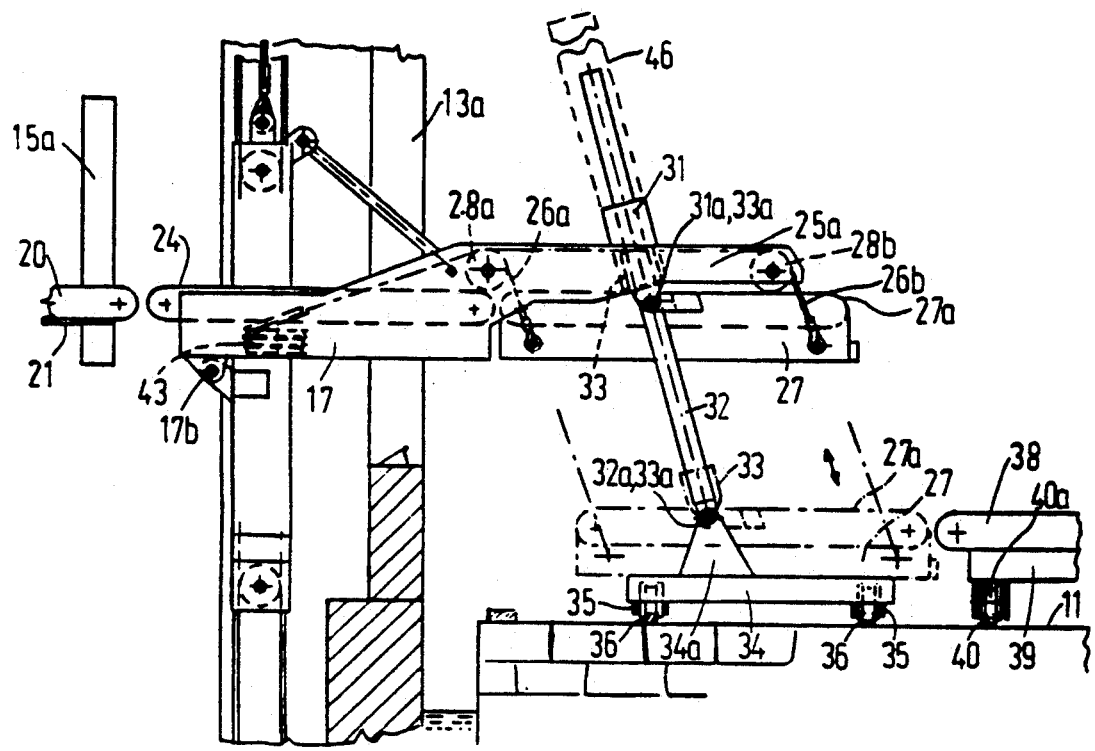
FIG. 4 shows a section of FIG. 2 on a larger scale.

In FIG. 4, the pivotal axis 33a of the sliding sleeve 33 is shown coinciding with the pivotal axis 31a of the guide sleeve 31 in the upper position of the transfer platform, as illustrated by full lines. This means that the transfer platform 27 is not subjected in its upper position to relative movement relative to the reloading platform 17 and thereby will participate in turning movements and vertical movements of the ship relative to the quay. Similarly in the lower position of the transfer platform 27 in FIG. 4, as shown by chain lines, pivotal axis 33a of the sliding sleeves 33 coincides with the pivotal axis 32a of the lower end of the guide means 32. This means that the transfer platform 27 is not subjected in its lower position to relative movement relative to the carriage 34 and thereby will be independent of turning movements of the ship and movements of the ship vertically relative to the quay.

Figure 5:
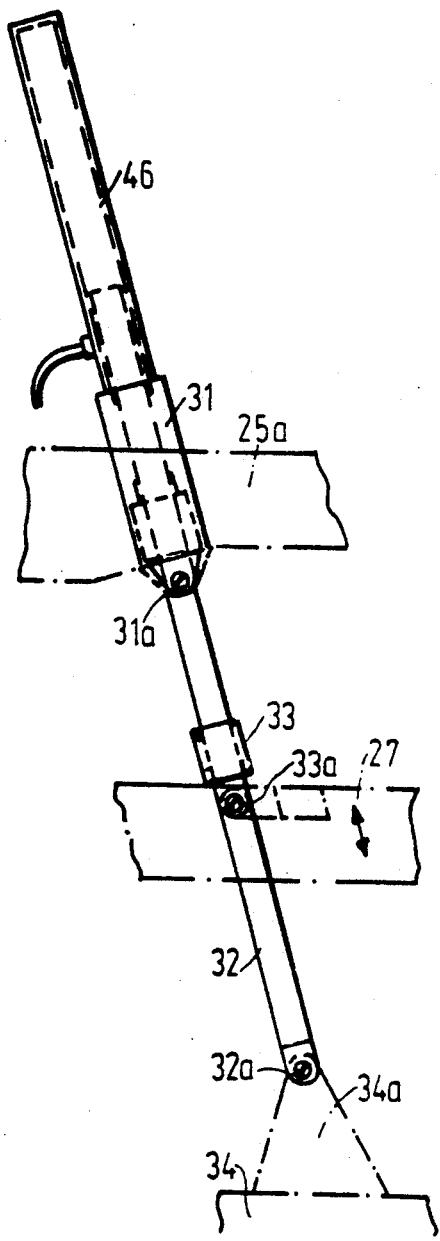
FIG. 5 shows the detail as illustrated in FIG. 4 in an intermediate position.

In FIG. 5 the transfer platform 27 is shown in an intermediate position. In intermediate positions between the upper and lower positions, the transfer platform 27 will take part in the turning movements and vertical movements of the ship relative to the quay, but then guided in a controlled manner by the guide means 32 and the hoisting wires 26a,26b. The hoisting wires can if necessary be connected to a lift compensator known per se for compensating for movements of the ship relative to the quay.

By means of the guide means 32, which are pivotably mounted relative to the ship via the guide sleeve 31 and to the carriage 34 via the bracket 34a, relatively free movement of the ship can be permitted relative to the quay in a plane transversely of the quay and by means of the carriage 34, a correspondingly relatively free movement of the ship can be allowed in the fore-and-aft direction along the quay.

As shown in section in FIG. 4 the standby platform 39 is in the form of a carriage which is moveable in the for-and-aft direction of the ship via wheels 40a on rails 40 which run parallel to the rails 36. The carriage 39 is (as is shown in FIG. 3) adapted to be moved forwards and backwards along the rails 40 to an equivalent extent as the carriage 34 is moved along the rails 34, in order to allow the conveyors 27a,27b to be flush with the conveyors 38 on the standby platform 39 during transfer of cargo between these. Furthermore, the carriage 39 is adapted to be displaced, so that its conveyors 38 are alternately flush with a common conveyor 41 which passes from the stand by platform 39 to a warehouse 42 on the quay 11.

According to a first embodiment of the transfer means, which is shown in detail in FIG. 4, the upper support member (illustrated by the arm 25a), the transfer platform 27 and the guide means 32 are fastened as a unit to the reloading platform 27 on the ship. In this connection the rods 32 are readily releasably connected to the brackets 34a on the carriage 34, so that the carriage 34 can be loaded again at the use location. The transfer means or the most important parts of this are consequently adapted to be transported together with the ship from harbour to harbour for connection to an existing transport system in the harbour in question. The reloading platform 17 with the associated transfer means is pivotable about a horizontal axis, as shown by the pivot pin 17b in FIG. 4, from the illustrated horizontal, active working position to an inactive, vertical position within the side of the ship and within the port opening 13a.

Figure 6:
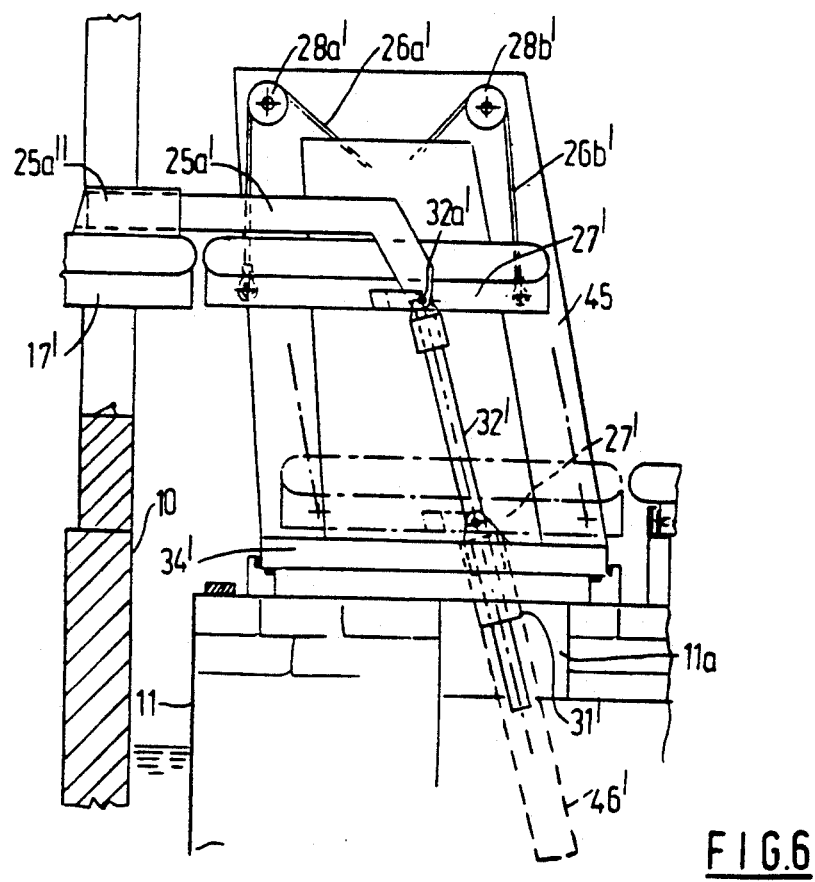
FIG. 6 shows a second construction of the detail as illustrated in FIG. 4.

In FIG. 6 there is shown a second embodiment where the arm 25a' constitutes the one half of an upper support member which is readily mountably and readily dismountably fastened to corresponding guide 25a" on reloading platform 17. In this case the upper support member, the transfer platform 27', the guide means 32' and the carriage 34' with associated slide means form a part of a coherent construction, which also comprises a carrying stand 45 with associated guide pulleys 28a',28b' for the carrying wires 26a',26b' which are controlled by an elevator machinery (not shown further) in the stand 45. The transfer means in this case is present in the associated harbour for use in different ships which call at the harbour.

In the embodiment as shown in FIG. 6, the rod 32' is axially displaceable in the opposite direction to that which is shown in FIG. 5 and in this connection the free end of the rod 32' is received in a cavity 11a' in the quay. In this connection, the guide sleeve 31' is pivotably mounted on the carriage 34', while the upper end of the rod 32' is pivotably mounted about a pivotal axis 32a' in the carrying arm 25a'.

By means of a pair of one-way operating hydraulic (or pneumatic) cylinders 46 (one at each end of the platform 27), which in FIG. 5 are shown connected to the guide sleeve 31, portions of the listing loading of the ship can be transferred from the arms 25a,25b, the slide sleeves 31 and the cylinders 46 to the rod 32 and further to the ground via the carriage 34. Alternatively, the one-way operating cylinders can be connected between the upper support member (the arms 25a,25b) and the lower support member (the carriage 34). In both cases the extra, intermittent weight loading will be able to be transferred via the carriage 34 to the underlying rails so that a frictional locking of the carriage in a set position can be achieved so long as the listing occurs, but this locking is eliminated again immediately the listing ceases. By this there is obtained an effective, intermittent, elastically yielding support between ship and carriage during the listing movement. Immediately the listing movement ceases, the carriage is released for self-regulating adjustment of this fore-and-aft relative to the ship. Similar effects are also obtained by the transfer of the weight loading of the transfer means from the carriage 34 to the ship, so that listing of the ship can be avoided or reduced during the weight transfer.

In FIG. 7 to 13 there are shown loading operations in several following working steps.

Figure 7:
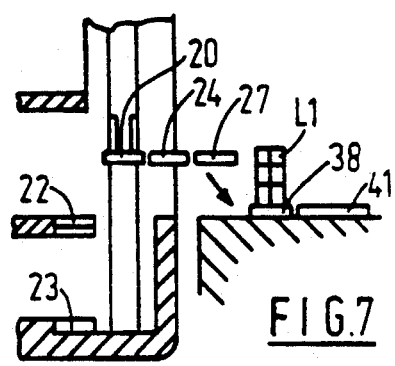
FIG. 7-13 shows schematically the stepwise work cycles the cargo passes through in a loading operation.
Figure 8:
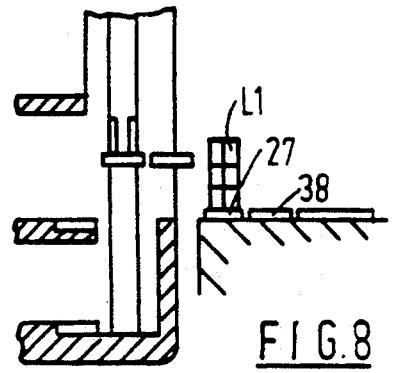

In FIG. 7 a cargo L1 is transported into place on the conveyor 38 on the quay and the platform 27 is lowered down on the quay for transfer from the conveyor 38 to the platform 27, as is shown in FIG. 8.

Figure 9:
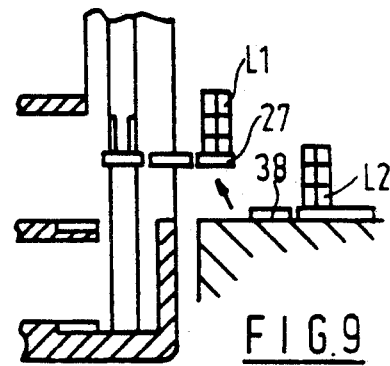
Figure 10:
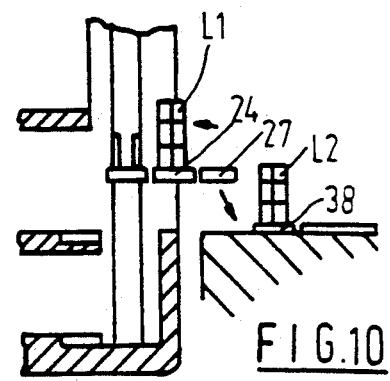

In FIG. 9 the cargo L1 is lifted up flush with the conveyor 24 for transfer to the conveyor 24 as is shown in FIG. 10. At the same time an additional cargo L2 is conveyed as shown in FIG. 9 and 10 correspondingly as shown for the cargo L1 in FIG. 7 and 8.

Figure 11:
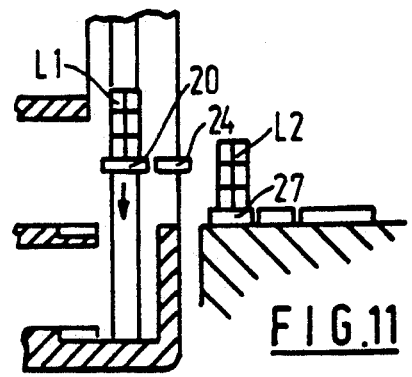

In FIG. 11 the cargo L1 is transferred to the conveyor 20 on the elevator so as to be transferred to a position flush with the conveyor 22 internally in the ship. In FIG. 11 the cargo L2 is transferred to the platform 27.

Figure 12:
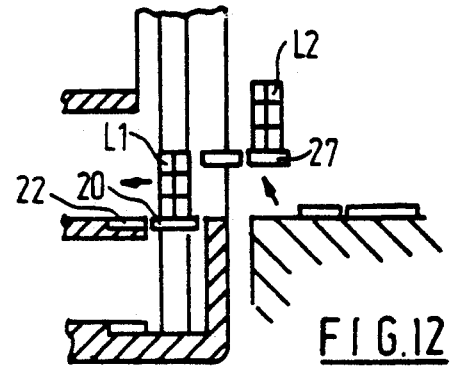
Figure 13:
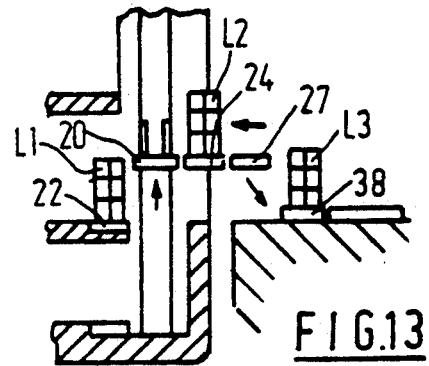

In FIG. 12 and 13 the transfer of the cargo L1 from the conveyor 10 to the conveyor 22 is shown, while the cargo L2 is transferred from the platform 27 to the conveyor 24. While this is proceeding a further cargo L3 can be conveyed to the conveyor 38 as shown in FIG. 13.

It will be evident that the units of cargo can be transferred indenpendently of each other between quay and ship as is indicated above, but in practice it is appropriate to place two units of cargo on the platform 27 and transfer these cargo units parallel to the position as shown in FIG. 12 and if necessary totally forward to the position as shown in FIG. 13.

I claim:

1. System for transferring cargo from ship to quay and vice-versa, via a side port opening in the ship, comprising a first cargo elevator provided with a first conveyor and located within the side port opening, for transporting cargo vertically within the ship, and a second cargo elevator including a transport platform provided with a second conveyor and located outside the side port opening for transporting cargo outside of the ship between the side port opening of the ship and the quay, and a reloading platform arranged in the side port opening with an associated third conveyor for transporting cargo to and from the first and the second conveyor, and a fourth conveyor arranged on the quay for transporting cargo on the quay to and from the second elevator, and hoisting means for lifting and lowering the transport platform in relation to the fourth conveyor and the third conveyor along an axially extendable, link-forming guide means, characterized in that the guide means for support of the transfer platform therein during lifting and lowering of the platform, comprises a pair of separate, mutually spaced guide means, each guide means extending in parallelism laterally of the quay and being separately connected to a first support member fastened to the ship in extension of the third conveyor and to a second support member supported on rails on the quay in extension of the fourth conveyor.

2. System in accordance with claim 1, characterized in that the guide means, which are rod-shaped, are at one end axially movable relative to the first support member and relative to the second support member, and that the guide means are pivotally mounted about a first upper, horizontal axis and about a second lower, horizontal axis which extends parallel to the first axis and parallel to the rails on the quay, while the second support member is movable in a fore-and-aft direction along rails on the quay.

3. System in accordance with claim 1 or 2, where the transfer platform (27) is carried via the first support member (25a,25b) on the reloading platform 917), characterised in that the guide means (32) are axially displaceable in sleeve-shaped control means (31) which are pivotably mounted about the first axis (31a) on the first support member (25a,25b).

4. System in accordance with claim 1 or 2, where the transfer platform (27') is carried via a carrying stand (45) on the second support member (34'), characterised in that the guide means (32') are axially displaceable in sleeve-shaped control means (31') which are pivotably mounted about the second axis on the second support member (34').

5. System in accordance with claim 3, characterised in that the guide means (32) are adapted to exert a hydraulic elastic force of a specific size in one power transfer direction between the transfer platform (27) and the lower support member (34) or between the upper support member (25a,25b) and the lower support member (34), by a one-way operating pneumatic or hydraulic pressure cylinder with pressure build up in one direction of movement and pressure discharge in the opposite direction of movement by the weight loading from the transfer platform and cargo or by the weight loading from the ship.

6. A transfer system for transferring cargo between a ship and a quay, said system comprising
   a transfer platform having at least one conveyor for transporting cargo horizontally;
   a first support member for securement to a ship;
   a second support member for mounting on a quay;
   a pair of guide means pivotally connected to said transfer platform at opposite sides thereof, said pair of guide means being pivotally connected to and between said support members for guiding said platform therebetween and between said support members, and means for lifting and lowering said platform along said guide means including means for maintaining said platform in a horizontal position.

7. A transfer system as set forth in claim 6 wherein said platform has a pair of conveyors disposed in side-by-side relation.

8. A transfer system as set forth in claim 6 which further comprises a reloading platform for mounting in a ship and wherein said first support member includes a pair of arms secured to and projecting from said reloading platform and said guide means are of rod shape and extend from said arms.

9. A transfer system as set forth in claim 8 wherein said means for lifting and lowering includes a pair of hoisting wires secured to said transfer platform, a pair of guide pulleys on said arms for guiding said wires thereon and machinery in said reloading platform for winding and unwinding of said wires to raise and lower said transfer platform along said rod shaped guide means.

10. A transfer system as set forth in claim 6 wherein said second support member is movable carriage.

11. A transfer system as set forth in claim 6 which further comprises a stand having said support members, said guide means and said means for lifting and lowering mounted thereon.

12. In combination
a ship having a side port opening, a reloading platform extending through said opening and a cargo elevator communication with said platform for conveying cargo therebetween;
a quay having a conveyor for transporting cargo; and
a transfer system for transferring cargo between said platform on said ship and said conveyor on said quay, said system including a first support member secured to said reloading platform, a second support member mounted on said quay, guide means extending between said support members, a transfer platform movably mounted on said guide means and having at least one conveyor thereon, and means for lifting and lowering said transfer platform between said support members to selectively communicate with said conveyor on said quay and said reloading platform on said ship.

13. The combination as set forth in claim 12 wherein said reloading platform is pivotally mounted on said ship for movement through said side port opening.

14. The combination as st forth in claim 12 wherein said first support member is releasably secured to said reloading platform.

15. The combination as set forth in claim 14 wherein said transfer system includes a strand having said support members, said guide means and said means for lifting and lowering mounted thereon.

16. The combination as set forth in claim 12 wherein said quay has a pair of parallel rails extending parallel to said ship and said second support member is a carriage movably mounted on said rails.

17. The combination as set forth in claim 12 wherein said guide means includes at least one rod pivotally mounted to each said support member and to said transfer platform.

* * * * *

UNITED STATES PATENT AND TRADEMARK OFFICE
CERTIFICATE OF CORRECTION

PATENT NO. : 5,271,701
DATED : Dec. 21, 1993
INVENTOR(S) : Moritz Hopland It is certified that error appears in the above-identified patent and that said Letters Patent is hereby corrected as shown below:

Column 8, line 33 "917)" should be -(17)-

Column 9, line 31 "communication" should be
 -communicating-

Signed and Sealed this

Seventeenth Day of May, 1994

Attest:

BRUCE LEHMAN

*Attesting Officer*     *Commissioner of Patents and Trademarks*